US012138880B2

(12) United States Patent
Rosengren

(10) Patent No.: US 12,138,880 B2
(45) Date of Patent: Nov. 12, 2024

(54) TOOLING ASSEMBLY FOR POWDER COMPACTING PRESS MACHINE

(71) Applicant: System 3R International AB, Vaellingby (SE)

(72) Inventor: Jonas Rosengren, Bromma (SE)

(73) Assignee: SYSTEM 3R INTERNATIONAL AB, Vaellingby (SE)

( * ) Notice: Subject to any disclaimer, the term of this patent is extended or adjusted under 35 U.S.C. 154(b) by 308 days.

(21) Appl. No.: 17/872,031

(22) Filed: Jul. 25, 2022

(65) Prior Publication Data

US 2023/0036287 A1 Feb. 2, 2023

(30) Foreign Application Priority Data

Jul. 27, 2021 (EP) .................................. 21 187 867

(51) Int. Cl.

| | |
|---|---|
| ***B29C 43/32*** | (2006.01) |
| ***B30B 11/02*** | (2006.01) |
| ***B30B 11/04*** | (2006.01) |
| ***B30B 15/02*** | (2006.01) |
| ***B30B 15/06*** | (2006.01) |
| ***B30B 15/28*** | (2006.01) |

(52) U.S. Cl.

CPC ............ *B30B 11/04* (2013.01); *B30B 11/027* (2013.01); *B30B 15/026* (2013.01); *B30B 15/065* (2013.01); *B30B 15/281* (2013.01)

(58) Field of Classification Search

CPC ......... B30B 11/02; B30B 11/04; B30B 15/02; B30B 15/026; B30B 15/028; B30B 15/065; B29C 33/73; B29C 43/32

See application file for complete search history.

(56) References Cited

U.S. PATENT DOCUMENTS

| | | | | |
|---|---|---|---|---|
| 6,047,621 | A | 4/2000 | Dries et al. | |
| 6,361,306 | B1 * | 3/2002 | Hinzpeter ............... | B30B 11/08 425/193 |
| 8,408,111 | B2 * | 4/2013 | Johnston .............. | B21D 45/006 83/698.91 |
| 9,738,048 | B2 | 8/2017 | Hediger | |
| 2003/0167819 | A1 * | 9/2003 | Olsson .................... | B30B 11/08 72/407 |
| 2009/0051094 | A1 | 2/2009 | Sandmeier | |

FOREIGN PATENT DOCUMENTS

| | | | |
|---|---|---|---|
| EP | 3106295 | A1 | 12/2016 |
| EP | 3587003 | A1 | 1/2020 |
| WO | 2009030699 | A1 | 3/2009 |

* cited by examiner

*Primary Examiner* — Thu-Khanh T. Nguyen

(74) *Attorney, Agent, or Firm* — LEYDIG, VOIT & MAYER, LTD.

(57) ABSTRACT

A tooling assembly is for a powder compacting press machine, which has a lower punch chuck and a core rod chuck. The tooling assembly has: a lower punch with a lower punch drawbar for holding the lower punch in the lower punch chuck in the powder compacting press machine; a core rod with a core rod drawbar for holding the core rod in the core rod chuck in the powder compacting press machine; and a coupling mechanism configured to enable a connection between the lower punch and the core rod. The coupling mechanism has a male coupling element on an outer surface of the core rod and a female coupling element on an inner surface of the lower punch drawbar. The male coupling element is an elastic element.

11 Claims, 4 Drawing Sheets

TOOLING ASSEMBLY FOR POWDER COMPACTING PRESS MACHINE

CROSS-REFERENCE TO PRIOR APPLICATIONS

This application claims benefit to European Patent Application No. EP 21 187 867.3, filed on Jul. 27, 2021, which is hereby incorporated by reference herein.

FIELD

The present disclosure is related to a tooling assembly for a powder compacting press machine.

BACKGROUND

Powder compaction is a widely used technology to produce metal parts by compacting metal powder in a die through high pressures. Main equipment required for the powder compaction process includes the machine and the tool sets mounted into the machine during the production. In the recent years, CNC controlled machines have been developed which improves the automation of this process, and thereby the production sufficiency. Thus, the demand of automation of the tool-set is increasing to further enhance the production sufficiency. Additionally, the machines introduced nowadays makes it possible to utilize the automated tool-set.

Main challenges to realize fully automated powder compaction process are limited access to the machining area, especially inside of the machine and a hostile environment caused by powder. A conventional tool set includes at least three tools: an upper punch, a die, a lower punch. Besides these parts, a core rod is one of the frequently used tools for power compaction to form holes in the metal part. The core rod is employed in the powder compaction device whenever an object having a hole is produced from a powder material.

WO 2009/030699 discloses a die press assembly for pressing carbide steel cutting inserts for cutting tools. Such inserts have a central hole for mounting the insert in the free end of the cutting tool. In order to form the center hole, a core pin must be provided and arranged through the die. The press assembly comprises the upper punch, the lower punch and the die. The assembly includes a core pin for forming the center hole. For each element, a clamping element including a chuck and a holder is provided for clamping and holding the element in the workstation at the defined positions. Upon exchanging from one size of metal cutting insert to another, all the chucks remain in the powder pressing workstation. On the contrast, the die, the lower punch and the core pin together with their respective holders can be moved out of the workstation. For this reason, a locking device is used to remove the elements out of the workstation. The lower punch, the die and the core pin each have a bore for receiving the locking device. In particular, WO 2009/030699 describes that a radial locking pin is provided in a radial bore through the die, the lower upper punch and the core pin to connect these three elements together. This design requires additional activating mechanism to activate the locking device.

EP 3106295 discloses a magnetic coupling to couple the lower punch and the core rod. A first coupling element is mounted on the core rod and a second coupling element is arranged on the lower punch. On both coupling elements, permanent magnets are mounted and the magnetic force generated between the permanent magnets enable the connecting of the first coupling element and the second coupling element. In this manner, the core rod can be coupled with the lower punch. However, the magnetic coupling requires a complicated construction and is sensitive to debris. The metal powder can be easily attracted on the permanent magnet applied for the coupling element, thereby reduces the reliability of the coupling, and even damage the tools.

SUMMARY

In an embodiment, the present disclosure provides a tooling assembly that is for a powder compacting press machine, which has a lower punch chuck and a core rod chuck. The tooling assembly has: a lower punch with a lower punch drawbar for holding the lower punch in the lower punch chuck in the powder compacting press machine; a core rod with a core rod drawbar for holding the core rod in the core rod chuck in the powder compacting press machine; and a coupling mechanism configured to enable a connection between the lower punch and the core rod. The coupling mechanism has a male coupling element on an outer surface of the core rod and a female coupling element on an inner surface of the lower punch drawbar. The male coupling element is an elastic element.

DETAILED DESCRIPTION

Figure 2:
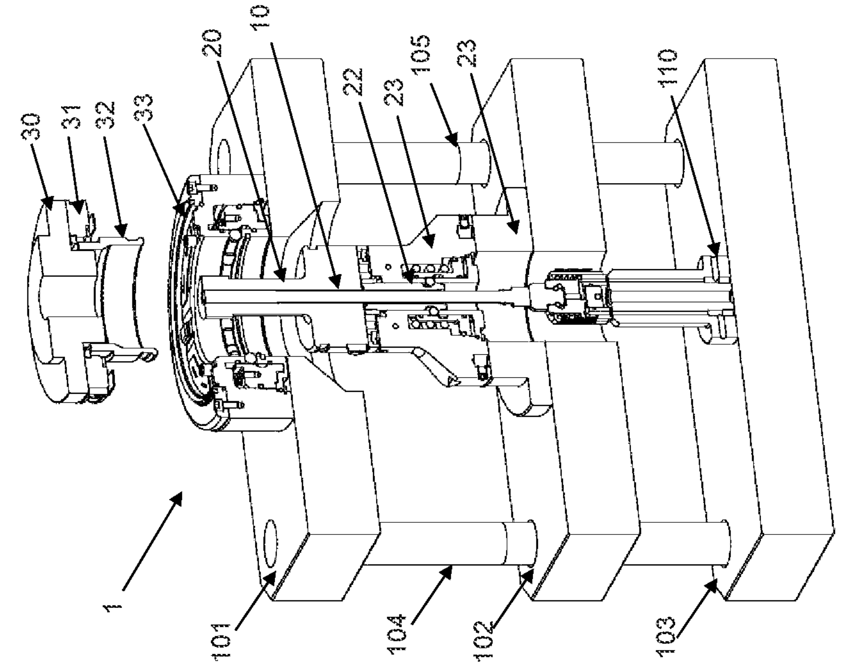
FIGS. 1 and 2 illustrate perspective views of a part of a power compacting press machine.

Aspects of the present disclosure provide a tooling assembly for a powder compacting press machine, which can be automatically removed from the press machine. Aspects of the present disclosure provide a tooling assembly for coupling and decoupling a core rod with a lower punch reliably. The tooling assembly features easy operation.

In the present disclosure, a tooling assembly for a powder compacting press machine for forming an object from metal powder including a lower punch chuck and a core rod chuck is provided. The tooling assembly comprises a lower punch having a lower punch drawbar for holding the lower punch chuck in the machine and a core rod having a core rod drawbar for holding the core rod in the core rod chuck. The tooling assembly further comprises a coupling mechanism to enable a connection between the lower punch and the core rod. The coupling mechanism comprises a male coupling element arranged on the outer circumferential surface of the core rod and a female coupling element arranged on the inner circumferential surface of the lower punch drawbar. In further, the male coupling element is an elastic element.

When the core rod is inserted into the lower punch drawbar along the axial direction and reaches the defined position, the male coupling element is mechanically interacted with the female coupling element to connect the core rod with the lower punch drawbar to build a unified assembly. In particular, the male coupling element is automatically engaged with the female coupling element, without any additional acting mechanism. Preferably, in the engaged state the core rod is located concentrically within the lower punch drawbar and the male coupling element faces the female coupling element in the radial direction of the lower punch drawbar and the core rod. The male coupling element can be directly or Indirectly connected to the female element. Moreover, the male coupling element can be disconnected from the female element, in particular by pulling the core rod out of the lower punch drawbar in the axial direction. Such coupling mechanism has a simple construction and has the advantage of easy handling.

Automation for machining process has been widely utilized in the most of machining process types, such as milling, grinding, electric-discharge machining to improve the production sufficiency. However, in the field of powder compacting press technology automation has not yet been fully introduced. One of the reasons is that the existing tooling set is not fully suitable for automation. For powder compacting press process, several parts including lower punch, core rod, die and the upper punch must be inserted into the machine under a difficult condition. The space in the machine is limited and dirt caused by the powder cannot be prevented. Additionally, the metal powder (e.g., carbon steel) is hard material and therefore the powder particle distributed in the tool set can damage the tool set. Thus, one main challenge is to design the tooling set which can be automatically changed, namely, inserted into the machine and removed from the machine by an automation system or a robot in a limited space in the machine. Another challenge is to design the tooling set which can withstand wear in a bad environment of debris and abrasive metal powder in the surrounding air.

Besides the tooling assembly, a die and an upper punch are used to press a metal part. Additionally, a die chuck for holding the die in the machine and an upper punch chuck for holding the upper punch are needed. The die is designed for pressing metal powder into a desired shape of a hard metal part. When one part is finished, in most of applications the upper punch, the die, the lower punch and the core rod must be removed out of the machine. In particular, the core rod is a thin elongated element and when inserted, surrounded by several parts, thus, the access to the core rod is spatially strongly limited. One solution is to insert and remove the core rod with the lower punch in one-step by connecting the core rod to the lower punch. As the lower punch is configured to be grasped by an automatic changer, the core rod can be inserted and removed automatically along with the lower punch.

The production cycle of the powder compacting press process comprises at least three phases. In the first phase, a set of tools including the lower punch with the core rod, the die and the upper punch is mounted into the machine. In order to enable to mount the tools in an automatic manner by using automatic tool changer, the lower punch and the core rod are inserted into the machine as one unit. This can be achieved by first interconnecting the core rod with lower drawbar outside of the machine. In the second phase, filling the die with a defined volume of the metal powder and pressing the powder within the die by upper punch and the lower punch. The core rod runs through the die thereby forming a hole in the final part. After the completion of the powder compaction process, the upper punch is dismounted from the machine first, and the compressive force acted on the powder material is thereby released. This is followed by ejecting the pressed part from the die and unloading the die and the lower punch with the core rod. The unloading process can also be accomplished by applying the automation system or a robot to reduce the production time and to achieve an automated and high production rate process. When another core rod must be applied for manufacturing the next part, the core rod is decoupled from the lower punch such that the other core rod can be coupled with the lower punch. Preferably, the coupling and the decoupling of the lower punch and the core rod occur at outside of the machine. In addition, it is preferable to ensure the connection between the core rod and the lower punch while the lower punch is being loaded/unloaded in the machine.

In an advantageous variant, the coupling occurs automatically when the core rod is inserted into the lower punch having the lower punch drawbar mounted thereon through the opening at the end of the lower punch drawbar. The lower punch and the lower punch drawbar each have a through bore running in the axial direction and the bores are centered when the lower punch drawbar is mounted on the lower punch. When the core rod is axially inserted into these bores, the male coupling element is first compressed in the radial direction against the inner wall of the lower punch drawbar, as the male coupling element is an elastic element. When the male coupling element reaches the position where the female coupling element is arranged, the pre-loaded male coupling element is released and expanded in the radial direction against the inner surface of the lower punch drawbar. The female coupling element is configured in a manner such that the male coupling element is locked at this position and substantially none-movable in the axial direction. It is possible to move the male coupling element in particular in the circumferential direction in the engaged state. When the male coupling element and the female coupling element is engaged, a mechanical clamping force is acted, in particular, mainly in the radial direction. The coupling force is not generated electrically or magnetically. It has the advantage of simple but reliable design.

The male coupling element can be fixedly mounted on the core rod or detachably mounted on the core rod. Even the core rod is detachably mounted on the core rod, it is preferred to design the core rod and the male coupling element in a manner such that they operate as one part. Before the core rod is inserted into the lower punch, the male coupling element is mounted thereon to enable an easy handling.

For accommodating the male coupling element, a recess is formed on the outer circumferential surface of the core rod, in particular the recess is directed formed on the core rod. Particularly, the recess is configured such that the male coupling element is moveably trapped in the recess. Preferably, the recess surrounds at least partially the outer circumferential surface of the core rod in order to safely receiving the male coupling element therein.

In one variant, the male coupling element is a ring-shaped elastic element. In order to achieve a simple design, the male coupling element is a spring clip, in particular, an open-ring shaped element having two ends.

As the counterpart of the male coupling element, at least one groove is formed on the inner circumferential surface of the lower punch drawbar to sever as the female coupling element. The groove has a defined height in the axial direction. On the same time, the groove serves as a reference element to automatically position the male coupling element, in particular in the axial direction.

Before the core rod is inserted into the lower punch, the spring clip is mounted on the core rod such that the spring clip sits in the recess. When the core rod having spring clip thereon is inserted from the lower part of the lower punch, more precisely from the lower part of the lower punch drawbar, the spring clip is compressed by the inner surface of the lower punch drawbar such that the two ends of the spring clip move towards each other and the spring clip is preloaded. When the spring clip reaches the position of the groove, the spring clip expands in the radial direction to achieve the engagement between the spring clip and the groove, thereby the core rod is connected with the lower punch drawbar.

When the spring clip is engaged with the groove, they form an interference fit or press fit. The coupling force generated by the coupling element is able to withstand the load, namely the total weight of the core rod and the core rod drawbar.

In one variant, the spring clip has a circular cross-section, such as round.

In a preferred variant, the diameter of the cross-section of the spring clip is larger than the height of the groove. This has the advantage that the disconnecting the spring clip from the groove can be eased. Preferably, the diameter of the cross-section of the spring clip is at least the half of the height of the groove.

In some embodiments, the male coupling element is made of the metal, same material as the core rod or different material than core rod. When the spring clip and core rod are both made of metal, the temperature change and humidity change have similar influences on the geometry variation. This results in a stable function.

The female coupling element is preferably arranged closely to the lower end of the lower punch drawbar to minimize the insertion path of the core rod.

More than one male element may be provided on the core rod and more than one female element may be provided on the lower punch drawbar.

Figure 1:
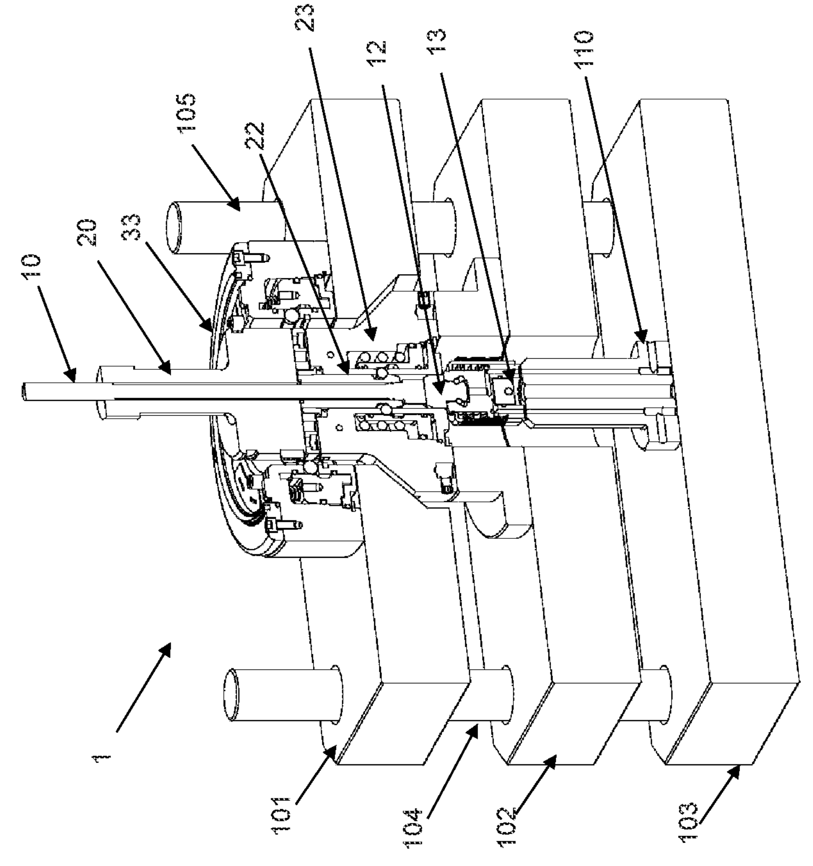

With reference to FIGS. 1 and 2, a powder compacting press machine 1 comprises a press adapter having a bottom plate 103, a middle plate 102 and a top plate 101. Two guiding pillars 104, 105 run through three plates in the vertical direction. The top plate and the middle plate are moveable in the vertical direction. Spaces are provided to adapt the requirements of different machines. In FIG. 1, a lower punch 20 and a core rod 10 are loaded into the machine and clamped in a lower punch chuck 23 and core rod chuck 13, respectively. The core rod chuck is carried by a spacer 110, which is fixed on the top of the bottom plate. The lower punch chuck 23 is fixed on the top surface of the middle plate. For simple handling, the top plate and the middle plates are lowered downwards before loading the lower punch along with the core rod to reduce the distance between the plates. FIG. 2 depicts the loading process of the die. The top plate and middle plate are moved upwards to the defined machining position before the die is loaded and clamped into the die chuck 33.

The unloading process is conducted in the opposite way as compared to the loading. The die is released from the die chuck and can be removed from the machine by an automatic tool changer. Afterwards, the lower punch is grasped by the automatic tool changer and removed out of the machine. As the core rod is connected to the lower punch, the core rod can also be removed out of the machine automatically.

Figure 4:
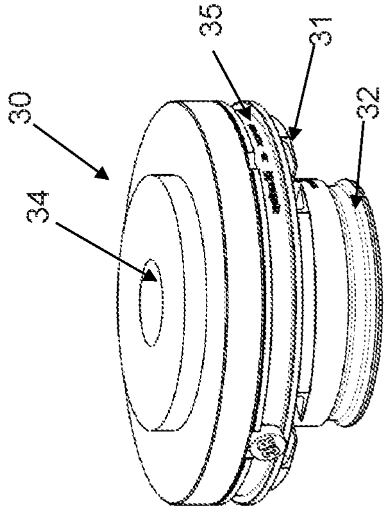
FIG. 4 illustrates a perspective view of a die.
Figure 3:
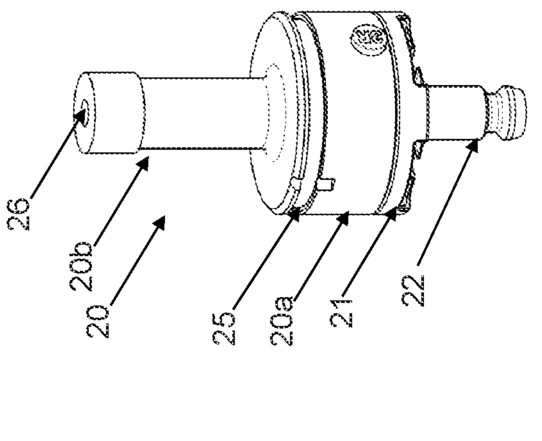
FIG. 3 illustrates a perspective view of a lower punch.

FIGS. 3 and 4 show details of the arrangement of the lower punch 20 with a lower punch drawbar 22 and the die 30 with the die drawbar 32, respectively. Before the lower punch is inserted into the machine, it is connected to a lower punch pallet 21 having reference elements thereon with a lower punch drawbar 22 mounted therein, since the lower punch with the lower punch pallet and the lower punch drawbar are to be inserted into the machine as one part. A through bore called as a lower punch bore 26 is provided in the axial direction of the lower punch for receiving the core rod therein. The lower punch pallet 21 and the lower punch drawbar each has an axial bore for allowing inserting the core rod there through. In the mounted state as shown in FIG. 2, all the axial bores are centered. The lower punch has two cylindrical portions with different diameters. The lower portion 20*b* has larger diameter than the upper portion 20*a*. In order to enable the automatic change of the lower punch, the lower punch gripping interface 25 is formed on the outer circumferential surface of the lower punch, in particular on the lower portion 20*b* of the lower punch. The automatic tool changer can reliably grasp the lower punch at the position of the lower punch gripping interface.

Before the die 30 is mounted into the machine, it is connected to a die pallet 31 with a die drawbar 32 mounted therein, since the die with the pallet and drawbar are to be inserted into the machine as one part. A through bore called as a die bore 34 is formed in the center of the die in the axial direction for receiving the punch and the core rod therein. The die pallet and the die drawbar each has an axial bore for allowing inserting the core rod there through. In the mounted state as shown in FIG. 4, all the axial bores are centered. In order to enable the automatic change of the die, a first gripper interface 35 is formed on the outer conferential surface of the die. In the embodiment shown in FIGS. 3 and 4, the lower punch gripping interface and the die gripping interface have a track-liked shape, such that two fingers of the gripper of the automatic tool changer can grasp the part from two sides.

Figure 5:
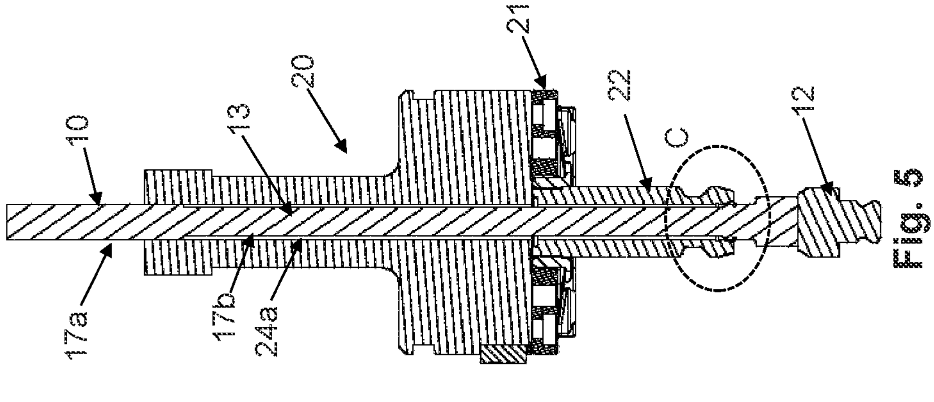
FIGS. 5 and 6 illustrate a cross-sectional view of the lower punch and a core rod.
Figure 6:
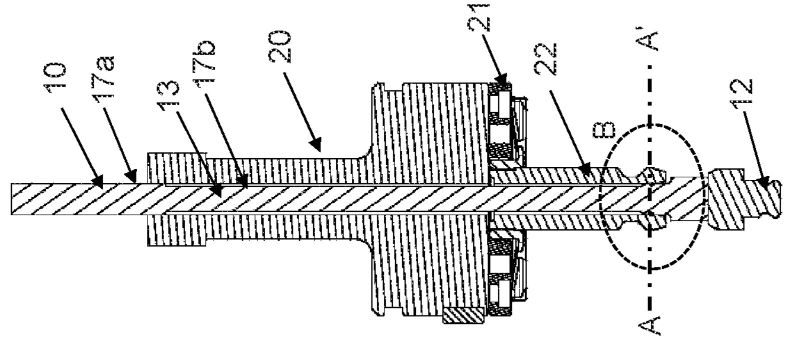
Figure 9:
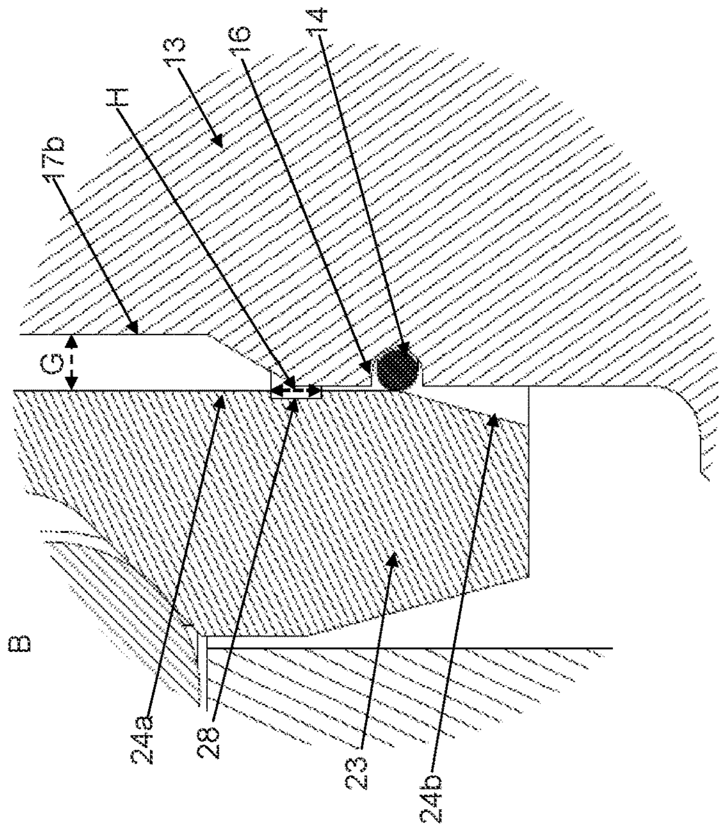

FIGS. 5 and 6 illustrate a clamping state and a released state of the core rod inserted into the lower punch, respectively. A core rod pallet 11 with a core rod drawbar 12 can be mounted at the lower end of the core rod. The core rod has an elongated core rod body 13. As shown in FIGS. 6 and 9, a first section of core rode 17*a* has a larger diameter than a second section of the core rod 17*b* such that a gap referenced with the letter G in FIG. 9 is generated between the inner surface of the first section of the lower punch drawbar 24*a* and the second section of the core rod 17*b*. This can prevent the debris to be clamped between the lower punch drawbar and the core rod thereby avoiding the damage of the tool assembly. The second section of the lower punch drawbar 24*b* located at the lower part of the drawbar has an oblique inner surface to avoid the damage of the top of the core rod during inserting the core rod into the drawbar, because the top of the core rod will not contact the oblique inner surface.

Figure 7:
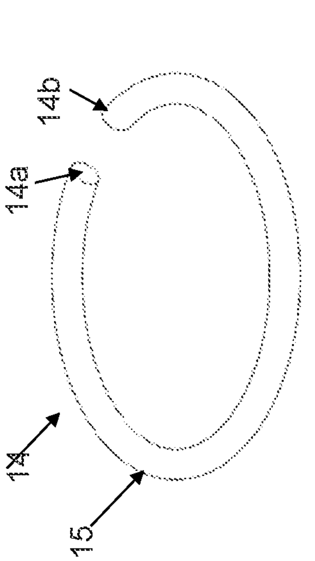
FIG. 7 illustrates a perspective view of a spring clip.
Figure 8:
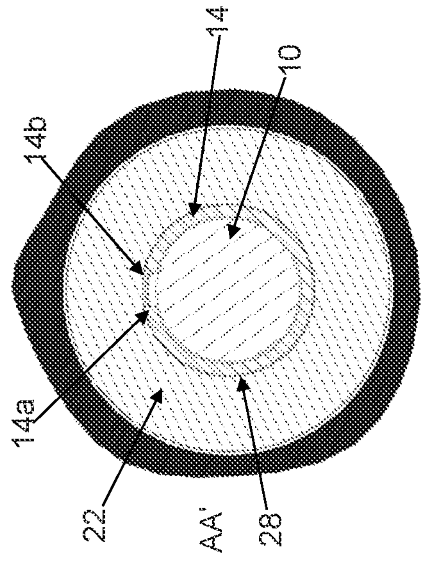
FIG. 8 illustrates a cross-sectional view of the core rod, spring clip and the lower punch.

In the embodiment shown in the figures, the male coupling element is an elastic element, in particular a spring clip 14 having two ends 14*a*, 14*b* as shown in the FIG. 7. FIG. 8 is a cross-sectional view along the line AA'.

A groove 28 is formed on the inner surface of the lower punch drawbar. The cross-section of the groove on the plan vertical to the radial direction can be circular or rectangle.

In order to enable the spring clip to couple or decouple with the groove in the drawbar, forces in the axial direction have to be applied. The cross section of the spring clip is circular. In one variant, the height of the groove the axial direction, which is referenced with the letter H in FIG. 9 in is designed to be less than half of the diameter of the cross-section of the spring clip, the curve will convert axial force into radial force thus make the spring clip to shrink. This goes for both entering as well as removal of core rod with the spring clip from lower punch drawbar. In another variant, the height of the groove the axial direction, which is referenced with the letter H in FIG. 9 is designed to equal to the diameter of the cross-section of the spring clip to achieve a reliable coupling.

Figure 10:
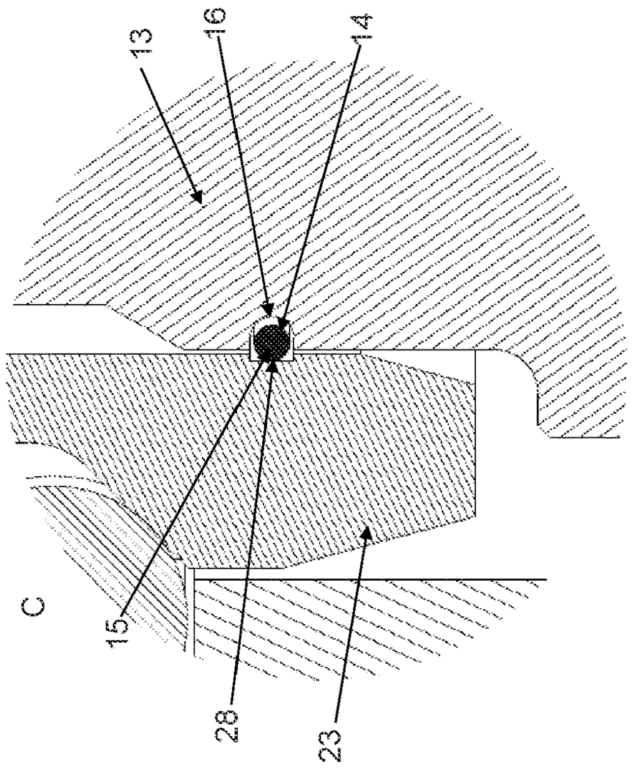
FIGS. 9 and 10 illustrate sectional views of the lower chuck and the core rod.

FIGS. 9 and 10 are enlarged illustration of the part C and B in FIGS. 5 and 6, respectively. They show the detailed position of the spring clip on the core rod in a sectional view along the axial direction. Additionally, FIG. 9 shows the state that core rod is inserted into the lower punch but before the spring clip 14 reaches the position where the groove is located. A recess 16 is formed on the outer circumferential surface of the core rod for receiving the spring clip therein. In particular, the recess is formed around the circumferential surface. The recess shown in FIG. 9 has a C-shaped cross-section. However, the shape of the cross-section is not limited to the shape shown in the figures. Other shapes of cross-section can be applied if the spring clip can be safely received therein and the function of the recess can be achieved. The recess is designed to safely maintain the spring clip therein and allow it to be compressed radially inward when the spring clip is engaged with the lower punch drawbar. The location of the recess is predefined to maintain a set position for axial location. The spring clip can be produced separately as the core rod, but should be kept in the recess when the core rod is inserted into the lower punch. During the whole inserting process and before the engagement of the spring clip and the groove, the spring clip is floating within the recess of the core rod. The spring clip will not expand unless a force is acted upon it, and the spring clip will not be compressed unless a force is acted upon it.

The spring clip has a ring-shape with two ends 14*a*, 14*b* as shown in FIG. 7. The diameter of the cross-section of the spring clip is chosen such that the spring clip is in non-expanded state received in the recess.

When the spring clip is engaged with the groove, the outer surface of the spring clip 15 is pressed at least partially on the surface of the groove 29. The spring clip is coupled by means of the axial and radial expansion of the spring clip in the groove to the groove. This coupling resists a large force generated by a high weight. The force of the spring clip is higher than the force from the weight of the core rod assembly, and higher than any axial force to the core rod that might arise in the load cycle, but much lower than the clamping force from the core rod chuck. It is not necessary to take into account the weight of the lower punch, since the spring clip is not used to lift the lower punch by the spring clip.

In one embodiment shown in FIG. 7, the spring clip has inner diameter of 9 mm and a cross section of 0.8 mm. The extraction force varies between about 25 N and 45 N depending on if the core rod is perfectly centered in the lower punch or pushed to the side. If the weight of the core rod is less than 2 Kg, a minimum of the extraction force of 50 N is required. In order to realize a robust system, the core rod should be designed to have a low weight. The diameter and the material of the spring clip can vary depending on the application and the size and weight of the core rod.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCES

1 powder compacting press machine
10 core rod
12 core rod drawbar
13 core rod body
14 spring clip
15 outer surface of spring clip
16 recess of core rod
17 core rod outer surface
17*a* first section of core rod
17*b* second section of core rod
20 lower punch
21 lower punch pallet
22 lower punch drawbar
23 lower punch chuck
24 lower punch drawbar inner surface
24*a* first section of lower punch drawbar
24*b* second section of lower punch drawbar
25 lower punch gripper section
26 bore of lower punch
27 bore of lower punch drawbar
28 groove
29 inner surface of groove
30 die
31 die pallet
32 die drawbar
33 die chuck
34 bore of die
35 first gripper interface
101 top plate
102 middle plate
103 bottom plate
104 105 guiding pillars

The invention claimed is:

1. A tooling assembly for a powder compacting press machine comprising a lower punch chuck and a core rod chuck, the tooling assembly comprising:

a lower punch comprising a lower punch drawbar configured to hold the lower punch in the lower punch chuck in the powder compacting press machine;

a core rod comprising a core rod drawbar configured to hold the core rod in the core rod chuck in the powder compacting press machine; and a coupling mechanism configured to enable a connection between the lower punch and the core rod, the coupling mechanism comprising a male coupling element arranged on an outer surface of the core rod and a female coupling element arranged on an inner surface of the lower punch drawbar, wherein the male coupling element is an elastic element.

2. The tooling assembly according to claim 1, wherein the male coupling element is a ring-shaped elastic element, comprising an open ring-shaped element having two ends.

3. The tooling assembly according to claim 1, wherein the male coupling element is a spring clip.

4. The tooling assembly according to claim 1, wherein the male coupling element is arranged at least partially surrounding the outer circumferential surface of the core rod.

5. The tooling assembly according to claim 1, wherein a recess is on the outer circumferential surface of the core rod and configured to accommodate the male coupling element therein, the recess being configured such that the male coupling element is capable of being moveably trapped in the recess.

6. The tooling assembly according to claim 1, wherein the male coupling element has a circular cross-section.

7. The tooling assembly according to claim 1, wherein at least one groove is on the inner circumferential surface of the lower punch drawbar serving as the female coupling element and the groove has a defined height in the axial direction.

8. The tooling assembly according to claim 6, wherein a diameter of a cross-section of the male coupling element is at least half of the defined height of the groove or substantially equal to the defined height of the groove.

9. The tooling assembly according to claim 1, wherein the male coupling element is made of metal.

10. The tooling assembly according to claim 1, wherein the male coupling element is arranged closely to a lower end of the core rod.

11. The tooling assembly according to claim 1, wherein the female coupling element is arranged at a lower end of the lower punch drawbar.

* * * * *